United States Patent [19]
Brodt et al.

[11] Patent Number: 6,146,704
[45] Date of Patent: Nov. 14, 2000

[54] USE OF AQUEOUS POLYMER DISPERSIONS FOR PROTECTING METALLIC SURFACES AGAINST CORROSION

[75] Inventors: Gregor Brodt, Heppenheim; Arend Jouke Kingma, Ludwigshafen; Ulrich Schröder, Frankenthal, all of Germany

[73] Assignee: BASF Aktiengesellschaft, Ludwigshafen, Germany

[21] Appl. No.: 09/147,779

[22] PCT Filed: Sep. 4, 1997

[86] PCT No.: PCT/EP97/04813

§ 371 Date: Mar. 5, 1999

§ 102(e) Date: Mar. 5, 1999

[87] PCT Pub. No.: WO98/10023

PCT Pub. Date: Mar. 12, 1998

[30] Foreign Application Priority Data

Sep. 5, 1996 [DE] Germany .............. 196 36 077

[51] Int. Cl.$^7$ ............... B05D 3/02; B05D 7/16
[52] U.S. Cl. ............... 427/388.4; 106/14.12; 106/14.13; 106/14.15; 106/14.18
[58] Field of Search ............ 427/388.4; 106/14.12, 106/14.13, 14.15, 14.18

[56] References Cited

U.S. PATENT DOCUMENTS

| | | |
|---|---|---|
| 4,693,909 | 9/1987 | Ziegler et al. . |
| 4,750,933 | 6/1988 | Brandstetter et al. . |
| 4,996,259 | 2/1991 | Koehler et al. . |

FOREIGN PATENT DOCUMENTS

| | | |
|---|---|---|
| 0 201 702 | 11/1986 | European Pat. Off. . |
| 0 359 045 | 3/1990 | European Pat. Off. . |
| 0 799 872 | 10/1997 | European Pat. Off. . |
| 22 67 030 | 12/1976 | Germany . |
| 34 20 168 | 12/1985 | Germany . |
| 196 21 037 | 11/1997 | Germany . |
| 3-131370 | 6/1991 | Japan . |
| 1 541 309 | 2/1979 | United Kingdom . |

OTHER PUBLICATIONS

T.G. Fox, Bull. Am. Phys. Soc. (Ser II), vol. 1, p. 123, "Influence of Diluent and of Copolymer Composition on the Glass Temperature of a Polymer System", 1956.

Ullmanns Encyklopädie der technischen Chemie, 4 ed., vol. 19, pp. 17–20, "Polyacryl–Und Polymethacryl–Verbindungen", 1980.

D.E. Bisset, et al., The Printing Ink Manual, Third Edition, pp. 209–210, 1984.

Ullmann's Encyclopedia of Industrial Chemistry, vol. A20, pp. 243–413, "Pigments, Inorganic", 1992.

H. Saechtling, Kunststoff–Taschenbuch, 21$^{st}$ Edition, pp. 40–43, 1979.

Houben–Weyl, Methoden der organ. Chem., "Makromolekulare Stoffe", Table of Contents, 4 pages, 1987.

*Primary Examiner*—Erma Cameron
*Attorney, Agent, or Firm*—Oblon, Spivak, McClelland, Maier & Neustadt, P.C.

[57] ABSTRACT

Aqueous polymer dispersions based on copolymers of $C_2$–$C_{14}$ olefins and monomers which contain acidic functional groups or are able to form them by hydrolysis, which dispersions may also contain colorants and/or corrosion inhibitors dispersed or dissolved in the polymer phase, are used for protecting metallic surfaces against corrosion.

12 Claims, No Drawings

USE OF AQUEOUS POLYMER DISPERSIONS FOR PROTECTING METALLIC SURFACES AGAINST CORROSION

This application is a National Stage Application of International Application Serial No. PCT/EP97/04813, filed on Sep. 4, 1997.

The present invention relates to the use of aqueous polymer dispersions that comprise as component I) at least one polymer and as component II) at least one colorant and/or a corrosion inhibitor, and also, if desired, a UV stabilizer, component II) being present almost completely dispersed or dissolved in the polymer phase, for protecting metallic surfaces against corrosion.

Corrosion, especially in connection with metallic surfaces, is a serious problem. Corrosion damage, including secondary damage as a result of corrosion, gives rise to costs which amount to several percent of the gross national product of Germany (see Römpps Chemie-Lexikon under "Korrosion"). Because of this, a wide variety of techniques have been developed for protecting metallic materials against corrosion. Examples of these which might be mentioned include coating, plating with gold, with chromium and other metals, galvanizing, and the electrolytic zinc-plating of metallic surfaces. The skilled worker is also aware of the combination of various metallizing techniques with a coating operation. Not all coatings are suitable for protecting the base material against corrosion or as the metallizing layer. Some coating materials, especially those applied from aqueous dispersion, often indeed make a direct contribution to the corrosion of the substrate. Moreover, under corrosive conditions, many coating materials give rise to decorative damage, such as embrittlement, cracking of the coating film, clouding or discoloration of the coating film.

In principle, however, it should be possible to solve the above-mentioned problems by the use of appropriate polymers as coatings. On environmental grounds, preference is given in this context to those polymers which are applied from aqueous dispersion to the surface that is to be protected, thereby making it possible to avoid the use of solvents relative to the earlier solvent-containing coating materials. A disadvantage that is found, however, is that emulsifiers are generally required when aqueous polymer dispersions are prepared. These emulsifiers remain in the dispersions, with the consequence that the coatings produced from the dispersions likewise comprise the emulsifiers. Under prolonged weathering, these emulsifiers may diffuse out of the coatings and thereby reduce the strength of the coating or even attack the metallic surface that is to be protected.

EP-A 201 702 and U.S. Pat. No. 4,693,909 describe emulsifier-free dispersions based on ethylene-acrylic acid copolymers, which are suitable for coating and thus for the protection of metallic surfaces against corrosion. Disadvantageous, however, is the fact that discoloration of the metal surface may occur in the course of curing the coating film at elevated temperature. Since the coating dispersions are generally colorless, the coated articles have a relatively unattractive appearance and are therefore no longer marketable.

This problem can in principle be remedied if white or colored pigments are added to the dispersions. By adding corrosion-inhibiting pigments it is possible, moreover, to enhance the protective effect of the coatings as well. Customarily, however, pigments of this kind are incorporated into the finished coating dispersion by means of an emulsifier, or are added to the dispersion in the form of a ready-made pigment dispersion that has been produced using an emulsifier. In addition to the fundamental disadvantages resulting from the use of emulsifiers, it is found that the handling properties are impaired by the pigments. For example, edge coverage of the workpieces is poor when only a single coat is applied. In addition, the color effect brought about by the pigments are generally pale and not particularly decorative. If the amount of emulsifier is reduced, such dispersions are generally no longer stable; if it is increased, the mechanical stability of the coating drops. Pigment-containing dispersions based on ethylene-acrylic acid copolymers are described, for example, in prior US Application No. U.S. Ser. No. 08/625,151.

The prior German application P-19621037.2 describes emulsifier-free aqueous polymer dispersions which comprise colored pigments dispersed in the polymer phase. A proposed use is for the temporary protection of surfaces, for example glass, ceramic, coated metal or plastic, against mechanical damage. A particular advantage stated for the coatings obtainable from the polymer dispersions is that these coatings can be peeled off in one piece, like a sheet, from the surface that is to be protected.

It is an object of the present invention to provide aqueous polymer dispersions, containing colorants and/or corrosion inhibitors, which include little or no emulsifier and which are suitable for protecting metallic surfaces against corrosion. The coatings obtainable from the dispersions should ensure good adhesion to the metallic surfaces, high mechanical strength and good edge coverage even with a single coating operation.

We have found that this object can be achieved by the polymer dispersions described in P-19621037.2, which adhere very well to metallic surfaces and are suitable for long-term protection of metallic surfaces against corrosion.

The present invention therefore provides for the use of aqueous polymer dispersions comprising as component I)
  at least one polymer which includes in copolymerized form at least one $C_2$–$C_{14}$-olefin (monomer a)), at least one monomer b), which is copolymerizable with monomer a) and has at least one acidic functional group and/or a functional group which is converted by hydrolysis into an acidic functional group, and, if desired, further monomers c), and as component II)
  at least one colorant and/or one corrosion inhibitor and, if desired, a UV stabilizer, component II) being almost completely dispersed or dissolved in the polymer phase, for protecting metallic surfaces against corrosion.

The term metal surfaces hereinbelow refers to untreated metal surfaces and metal alloy surfaces, for example steel, aluminum, brass, copper, nickel, cobalt, bronze, silver, after-treated metal and metal-alloy surfaces, for example metal-plated metals, zinc-plated metals, chromated metals, zinc-plated and chromated metals, and also metal surfaces on nonmetallic substrates that are obtainable by vacuum vapor deposition of the substrate, for example by sputtering, cathode atomization or flash evaporation.

In the text below, $C_1$ to $C_n$ indicates the number of possible carbon atoms in a particular compound or a particular radical. $C_1$–$C_n$-alkyl refers to linear or branched alkyls or 1 to n carbons, examples being methyl, ethyl, n-propyl, isopropyl, n-butyl, 2-butyl, isobutyl, t-butyl, n-pentyl, 2-pentyl, neopentyl, n-hexyl, 2-ethylhexyl, n-octyl, n-decyl or n-dodecyl. $C_5$–$C_{10}$-cycloalkyl refers to cyclopentyl, cyclohexyl, cycloheptyl or cyclooctyl which is unsubstituted or substituted by 1, 2 or 3 $C_1$–$C_4$-alkyls, preferably methyl or ethyl. Aryl is preferably phenyl or naphthyl which is unsubstituted or substituted by 1–4 $C_1$–$C_4$-alkyls, $C_1$–$C_4$-alkoxys or halogens. Aralkyls are aryls connected via alkylenes, examples being benzyl or phenylethylene, which may also be unsubstituted or substituted.

Preferred monomers a) are $C_2$–$C_6$-olefins, especially ethylene, propene, 1-butene, 2-butene or isobutene or mixtures thereof, preference being given to mixtures containing ethylene as principal component. With particular preference, ethylene is used as sole monomer a).

Preferred monomers b) are monoethylenically unsaturated carboxylic acids and dicarboxylic acids, especially aliphatic α,β-unsaturated mono- and dicarboxylic acids of 3 to 10 carbons, such as acrylic, methacrylic, crotonic, 2-ethylpropanoic, 2-propylpropanoic, 2-n-butylpropanoic, maleic, fumaric, itaconic and citraconic acids. Also suitable are the monoesters of the abovementioned dicarboxylic acids, preferably those with $C_1$–$C_{12}$-alkanols, for example mono-n-butylmaleic esters, the anhydrides of the abovementioned dicarboxylic acids, such as maleic, itaconic or citraconic anhydride, and aromatic vinyl carboxylic acids, such as 2-, 3- or 4-vinylbenzoic acid. Other preferred monomers b) comprise monoethylenically unsaturated sulfonic acids, examples being vinylsulfonic, allylsulfonic and vinylbenzenesulfonic acid, monoethylenically unsaturated sulfinic acids, such as p-vinylbenzenesulfinic acid, monoethylenically unsaturated phosphonic acids, such as vinylphosphonic acid, and the monoesters thereof, monoethylenically unsaturated phosphoric acid monoesters, such as allyl phosphate, and the alkali metal salts of the abovementioned acids and monoesters. Particularly preferred monomers b) are acrylic acid, methacrylic acid and vinylsulfonic acid and/or their alkali metal salts.

Preferred monomers c) include, as noncrosslinking monomers $c_1$): the esters of monoethylenically unsaturated carboxylic acids, the amides of monoethylenically unsaturated carboxylic acids, for example acrylamide, methacrylamide and the N—$C_1$–$C_6$-alkyl- and N,N-di-$C_1$–$C_6$-alkyl derivatives thereof, $C_1$–$C_{10}$-alkyl vinyl ethers, for example methyl vinyl ether, ethyl vinyl ether, n-propyl vinyl ether and 2-ethylhexyl vinyl ether, diesters of monoethylenically unsaturated dicarboxylic acids, preferably those with $C_1$–$C_6$-alkanols, for example dimethyl maleate or di-n-butyl maleate, monoethylenically unsaturated phosphoric esters, monoethylenically unsaturated phosphonic esters, such as di-$C_1$–$C_6$-alkyl vinylphosphonates, vinyl and allyl $C_2$–$C_{12}$-alkanoates, for example vinyl and allyl acetate, vinyl and allyl propionate, vinyl and allyl butyrate, vinyl and allyl valerate, vinyl and allyl hexanoate, vinyl and allyl ethylhexanoate and vinyl and allyl decanoate.

Particularly preferred monomers $c_1$) comprise the $C_1$–$C_{10}$-alkyl, $C_5$–$C_{10}$-cycloalkyl, $C_6$–$C_{20}$-aryl and $C_7$–$C_{20}$-aralkyl esters, but especially the $C_1$–$C_{10}$-alkyl esters, of the monocarboxylic acids mentioned under b). Very particular preference is given to the $C_1$–$C_{10}$-alkyl esters of methacrylic and/or acrylic acid, examples being methyl acrylate and methacrylate, ethyl acrylate and methacrylat, n-propyl acrylate and methacrylate, n-butyl acrylate and methacrylate, 2-butyl acrylate and methacrylate, t-butyl acrylate and methacrylate, n-hexyl acrylate and methacrylate, and 2-ethylhexyl acrylate and/or methacrylate.

In addition, the monomers c) also comprise crosslinking and/or crosslinkable monomers $c_2$). These are polyfunctional monomers which in addition to the ethylenically unsaturated bond include an epoxy, hydroxyl, n-alkylol or carbonyl group. Examples thereof are the N-hydroxyalkyl amides and N-alkylol amides of the abovementioned ethylenically unsaturated carboxylic acids, for example 2-hydroxyethyl(meth)acrylamide and N-methylol(meth)acrylamide, and also glycidyl acrylate and glycidyl methacrylate. Other suitable crosslinking monomers $c_2$) are those having 2 or more non-congugated ethylenically unsaturated bonds, such as the diesters of dihydric alcohols with the abovementioned ethylenically unsaturated monocarboxylic acids, the vinyl esters or allyl esters of the ethylenically unsaturated carboxylic acids, or divinylaromatic compounds. Examples thereof are ethylene glycol diacrylate, 1,3-butylene glycol diacrylate, 1,4-butylene glycol diacrylate, propylene glycol diacrylate, vinyl methacrylate, vinyl acrylate, allyl methacrylate, allyl acrylate, diallyl maleate, diallyl fumarate, methylenebisacrylamide, cyclopentadienyl acrylate, tricyclodecenyl (meth)acrylate, divinylbenzene, divinylnaphthalene, N,N'-divinylimidazolin-2-one, triallyl phosphate or triallylcyanurate. In the preferred embodiments of the present invention, however, the polymers contain no copolymerized crosslinking monomers.

In the particularly preferred embodiments of the present invention, the polymers comprise as monomer a) ethylene as sole monomer and as monomer b) acrylic acid and/or methacrylic acid and also, if desired, vinylsulfonic acid and/or its alkali metal salts and, if desired, as monomer c), one or more $C_1$–$C_{10}$-alkyl acrylates or methacrylates, all in copolymerized form.

In a very particularly preferred embodiment the polymers comprise the following combinations of copolymerized monomers: ethylene/acrylic acid, ethylene/methacrylic acid, ethylene/acrylic acid/sodium or potassium vinylsulfonate, ethylene/acrylic acid/n-butyl acrylate, ethylene/acrylic acid/ 2-ethylhexyl acrylate, ethylene/acrylic acid/n-butyl methacrylate, and ethylene/acrylic acid/2-ethylhexyl methacrylate.

The polymer dispersions employed in accordance with the invention generally comprise from 50 to 98% by weight, in particular from 60 to 90% by weight of monomer a), from 2 to 50% by weight, preferably from 10 to 40% by weight of monomer b), from 0 to 40% by weight, preferably from 0 to 30% by weight of monomer $c_1$), and from 0 to 5% by weight, preferably from 0 to 1% by weight of monomer $c_2$) in copolymerized form.

The relative proportions of the monomers a), b), $c_1$) and $c_2$) are chosen such that the film-forming temperature (comparable with the glass transition temperature according to Fox: Fox et al., Bull. Am. Phys. Soc. (Ser. II) 1, 123 (1956); regarding the minimum film-forming temperature see also Ullmanns Enzyklopädie der technischen Chemie, 4th. edition, Verlag Chemie, Weinheim (1980), Vol. 19, p. 17 ff) is below 80° C., preferably below 50° C. and, with particular preference, below 25° C.

Colorants and corrosion inhibitors used can in principle be all prior art colorants and corrosion inhibitors which can be incorporated into the polymers, with the proviso that the stability or any other essential property of the colorants or corrosion inhibitors is not adversely affected by the acid groups that are present in the polymer. Conversely, the colorants or corrosion inhibitors should not adversely affect the stability of the polymer dispersions and/or of the coatings produced therewith. The colorants and the corrosion inhibitors are preferably selected from organic pigments, inorganic pigments, organometallic pigments or other organic compounds which are insoluble in the aqueous phase.

Examples of inorganic pigments that are suitable as colorants are titanium dioxide, $Al_2O_3$, barium sulfate, strontium sulfate, zinc oxide, zinc phosphates, black iron oxide, lead chromate, strontium chromate, barium chromate, new kinds of special-effect pigments, for example $TiO_2$- or $Al_2O_3$-coated mica flakes, and also metallic pigments such as aluminum powders or bronze powders.

Examples of organic pigments that are suitable as colorants comprise:

azo pigments, metal complex pigments, such as azo and azomethine metal complexes, isoindolinone and isoindoline pigments, phthalocyanine pigments, quinacridone pigments, perinone and perylene pigments, anthraquinone pigments, diketopyrrolopyrrole pigments, thioindigo pigments, dioxazine pigments, triphenylmethane pigments, quinophthalone pigments and fluorescent pigments. A compilation of other suitable pigments is given, for example, in "The Printing Ink Manual" D. E. Bisset et al. (editors), 3rd ed, Verlag Van Nostrand Reinhold Co. Ltd, Wokingham UK, 1984, p. 209; Ullmanns Enzyklopädie der technischen Chemie, 5th edition, vol. A3, pp. 144–149, A20, pp. 243–413, and H. Saechtling, Kunststoff-Taschenbuch, 21st ed., p. 40).

Suitable corrosion inhibitors comprise, in particular, inorganic pigments such as zinc phosphates, zinc borates, silicic acid or silicates, for example calcium or strontium silicates, and also organic pigments, for example intrinsically conductive polymers such as polypyrrol, polythiophene or polyaniline.

Suitable UV stabilizers are all inorganic or organic UV stabilizers which can be used for plastics, examples being substituted benzophenones, salicylic esters, hydroxyphenylbenzotriazoles, and the compounds known as hindered amine light stabilizers (HALS). They are generally used in amounts of from 0.01 to 1% by weight, based on the polymer.

The polymers employed in accordance with the invention and their preparation are known in principle to the skilled worker. They can be prepared by all common polymerization techniques, for example by emulsion polymerization (see Houben-Weyl, Methoden der organischen Chemie, Volume E20/I, Makromolekylare Stoffe, Georg-Thieme-Verlag, Stuttgart, 1987), or, preferably, by continuous high-pressure polymerization. The latter procedure is particularly advisable in the case of the highly volatile olefins ethylene and propylene. Moreover, emulsifier-free polymer dispersions are obtained by this method.

Continuous high-pressure polymerization is also known in principle to the skilled worker and can be carried out, for example, in the manner described in DE-A 34 20 168 and DE-A 35 12 564. The polymerization generally takes place at from 150 to 300° C. and at a pressure of from 1000 to 3000 bar in the presence of at least one free-radical initiator, for example a peroxo compound such as t-butyl peroxopivalate or an azo compound such as azobisisobutyronitrile. In addition to this, up to 5% by weight, based on the monomers, of regulators can be present. Examples of suitable regulators are aliphatic aldehydes of 3 to 6 carbon atoms, especially propionaldehyde or n-butyraldehyde, aliphatic ketones of 3 to 6 carbons, for example acetone or methyl ethyl ketone. In this context it is worth noting that the α-olefins having more than 3 carbons may likewise intervene in the polymerization as regulators. The polymerization conditions are adjusted such that the polymers have a melt viscosity at 120° C. of at least 1000 $mm^2/s$ as a lower limit (DFG Standard method C-IV7 (68), measured at 120° C.) and an MFI of at least 1 (measured in accordance with DIN 53753 at 160° C. under a load of 325 g) as upper limit.

The polymer dispersions are generally prepared by incorporating the colorant, the corrosion inhibitor and, if used, the UV stabilizer (component II) by customary methods, in a first step, into the solid polymer phase (component I). This can be done in a manner known per se, for example by coextrusion of the components, by continuous or discontinuous kneading or by stirring component II into the melted polymer. In this case the amount of component II is chosen such that it is preferably in the range from 0.05 to 50% by weight, in particular from 1 to 40% by weight and, with very particular preference, from 1.5 to 30% by weight, based on the mass of polymer.

In a second step the polymers, now together with component II, are converted into a dispersion by the customary methods. This is done preferably in the presence of a base, examples being sodium hydroxide or potassium hydroxide, ammonia, but preferably in the presence of alkylamines, alkyldiamines or alkyltriamines, especially those whose alkyl radicals are substituted by hydroxyl groups in free, ethoxylated or esterified form.

Particularly suitable amines are mono-, di- or trialkanolamines having preferably 2 to 6 carbon atoms in the hydroxyalkyl radical, monoalkyldialkanolamines and dialkylmonoalkanolamines having in each case 2 to 8 carbons in the alkyl and hydroxyalkyl radicals. The alkyl or hydroxyalkyl chains here may also include ether functions. It is of course also possible to use mixtures of said bases. Examples of particularly preferred amines are diethanolamine, triethanolamine 2-amino-2-methylpropan-1-ol, dimethylethanolamine and diethylethanolamine, dimethylaminodiglycol, diethylaminodiglycol and also ethylenediamine or diethylenetriamine.

The dispersions that are employed preferably comprise no emulsifier, since in general the polymers are self-emulsifying.

The polymers to which component II has been added are, for example, dispersed with stirring in an emulsifying autoclave at above the melting point of the polymer, preferably at from 90 to 180° C., in particular from 90 to 150° C., under a pressure of between atmospheric pressure and 4 bar, together with the necessary amount of water and the appropriate amount of a base, preferably an amine, diamine or triamine, and, if desired, with further auxiliaries. Techniques of this kind are described, for example, in DE-A 35 12 564, incorporated herein in its entirety by reference. The dispersion is then cooled, still with stirring, to room temperature. According to EP-A 359 045, likewise incorporated in its entirety by reference, the operation of dispersion can also be carried out in a customary extruder, preferably a twin-screw extruder, by mixing the components (polymer, water, base and auxiliaries) at from 70 to 200° C. and at a pressure of from 1 to 40 bar. In this case it is possible in principle to combine the incorporation of component II into the polymer with the emulsifying operation.

Suitable auxiliaries, which are preferably added in amounts of from 0.5 to 2% by weight, based on the overall mixture, are, in particular:

antifoams, such as ethylene oxide/propylene oxide block copolymers having from 5 to 50 EO/PO units of fatty alcohols of 8 to 20 carbons, of diols or triols such as ethylene glycol, and ethylenes diamines, leveling agents, such as the potassium salt of N-ethyl-n-perfluorooctanesulfonylglycine and Fluorad® FC 129 from 3 M, or else corrosion inhibitors, such as N-(2-ethylhexyl)succinic monoamide, N-(2-ethylhexyl) phthalic monoamide, phenylsulfonylamidocaproic acid, diisobutenylsuccinic acid or Medialan acid.

For the novel use for protecting metallic surfaces against corrosion, the polymer dispersions obtained in this way preferably have solids contents in the range from 5 to 40% by weight and, in particular, in the range from 10 to 35% by weight. The amount of base is in this case chosen so that at least 40%, preferably at least 50% and, in particular, at least 60% of the acid groups that are present in the polymer are in neutralized form.

The present invention additionally provides a method of protecting metallic surfaces against corrosion using the novel polymer dispersions. This is effected by coating the metal surfaces to be protected with the polymer dispersion. Owing to the favorable rheological properties of the dispersions it is possible to employ one of the customary techniques for this purpose. Suitable techniques are, for example, coating with a customary paint applicator system, single or multiple dipping of the parts that are to be coated into the polymer dispersion, spray application of the polymer dispersion in one or more passes, for example by airless spraying using a pressurized gun, spin coating, or electrostatic coating. This is generally followed by a drying step. Drying is done at room temperature or at elevated temperature, for example in a stream of hot air or with the aid of infrared light. The coating can be applied in a single operation or else by repeat applications with drying phases in between. The amount of dispersion per unit area is chosen so as to give, after drying, a film thickness of preferably less than 50 $\mu$m, particularly preferably less than 20 $\mu$m and, with very particular preference, less than 10 $\mu$m. The dried dispersion is firm to the touch after drying. An additional baking step subsequent to drying is not necessary, but may increase further the mechanical resistance of the coating.

Through the use of the novel dispersions in accordance with the novel method it is possible to protect a wide variety of metal and metal-alloy surfaces against corrosion. At the same time, coloration of the polymer dispersions allows decorative surfaces in a desired color to be obtained. In this context it is found particularly advantageous that these properties can be attained in one operation. Moreover, the coatings are notable for enhanced stability relative to known coatings, for example in respect of scratches or the cracking of the coating under mechanical stress.

The invention is now illustrated in more detail by way of the following nonlimiting examples.

EXAMPLES

Starting Materials

The polymers used were prepared in accordance with Example 1 of DE-A 35 12 564 by high-pressure polymerization of the monomers. The properties of the polymers are compiled in Table 1.

TABLE 1

| | Monomers | | | |
|---|---|---|---|---|
| Polymer No. | Ethylene | Acrylic acid | Ethylhexyl acrylate | MFI$_{160/325}$ [g/min] |
| 1 | 79 | 21 | — | 10 |
| 2 | 68 | 16 | 16 | 8 |
| 3 | 60 | 20 | 20 | 11 |

The MFI (melt flow index) indicates the amount of polymer melt, in grams, which is pressed through a standardized die within a defined time at a given temperature and under a given load. It is determined in accordance with DIN 53735. The particular index given indicates the measurement temperature (° C.) and the load (g).

Preparation of the colored polymers (Examples 1 to 12)

The colored polymers used were prepared in a twin-screw extruder. This was done by extruding the ethylene-acrylic acid copolymer No. 1 at 100° C. The respective color pigment was metered in through a side port so as to give the desired strength of color. The respective pigments and amounts are summarized in Table 2.

Heliogen® Blau K 6902 is a blue phthalocyanine pigment from BASF AG, Paliotol® Gelb K 1841 is a yellow pigment from BASF AG and Paliogen® Rot K 3911 HD is a red metal-complex pigment from BASF AG.

Titanium dioxide Cl 2220 was obtained from Kronos AG Printex® is a carbon black pigment from Degussa AG.

TABLE 2

| Example No. | Color | Pigment | % by weight of pigment |
|---|---|---|---|
| 1 | black | Printex ® | 2 |
| 2 | black | Printex ® | 5 |
| 3 | black | Printex ® | 10 |
| 4 | black | Printex ® | 20 |
| 5 | blue | Heliogen ® Blau K 6902 | 2 |
| 6 | blue | Heliogen ® Blau K 6902 | 5 |
| 7 | white | Titanium dioxide Cl 2220 | 2 |
| 8 | white | Titanium dioxide Cl 2220 | 5 |
| 9 | yellow | Paliotol ® Gelb K 1841 | 2 |
| 10 | yellow | Paliotol ® Gelb K 1841 | 5 |
| 11 | red | Paliogen ® Rot 3911 HD | 2 |
| 12 | red | Paliogen ® Rot 3911 HD | 5 |

Preparation of the colored dispersion (Examples 13 to 21)

210 parts of colored polymer were stirred at 115° C. with amine and water in a stirring vessel until after about 1 to 2 hours a uniform dispersion had formed. This dispersion was cooled with stirring and filtered to remove coarse constituents. The respective parameters are given in Table 3.

TABLE 3

| Example No. | Colored polymer No. | Amine | parts by weight of amine | parts by weight of water |
|---|---|---|---|---|
| 13 | 2 | Dimethylethanolamine | 36 | 754 |
| 14 | 3 | Dimethylethanolamine | 36 | 754 |
| 15 | 5 | Dimethylethanolamine | 36 | 754 |
| 16 | 9 | Dimethylethanolamine | 36 | 754 |
| 17 | 11 | Dimethylethanolamine | 36 | 754 |
| 18 | 7 | Dimethylethanolamine | 36 | 754 |
| 19 | 7 | 2-Amino-2-methylpropan-1-ol | 35.6 | 754.4 |
| 20 | 7 | Diethanolamine | 45.3 | 744.7 |
| 21 | 7 | Triethanolamine | 87.2 | 702.8 |

Comparison Examples 1 and 2 (corresponding to Examples 1 and 8 of U.S. Ser. No. 08/625,151).

Comparison Example 1

25% by weight of an ethylene/acrylic acid dispersion (Luwax® EAS 2 from BASF AG) were mixed in a stirring vessel with 20% by weight of a carbon black dispersion (Luconyl® Black 0066 from BASF AG).

Comparison Example 2

7.5% by weight of an ethylene/acrylic acid dispersion (Luwax® EAS 2 from BASF AG) were mixed in a stirring vessel with 2.5% by weight of a wax oxidate (Luwax® OA 3 from BASF AG) and 5% by weight of a carbon black dispersion (Luconyl® Black 0066 from BASF AG).

The following tests were used to determine the dispersion stability and the coating properties (see Table 4).

The crosshatch test (GH) was carried out in analogy to DIN EN ISO 2409. The substrate used for the test was a freshly degreased brass plate. The test results were classified as follows:

0 Cut edges completely smooth; none of the squares of the crosshatching has flaked off.
1 Small splinters of the coating flaked off at the points where the crosshatching lines intersect. Area which has flaked off is not greater than 5% of the crosshatched area.
2 The coating has flaked off along the cut edges and/or at the points where the crosshatching lines intersect. Flaked off area is markedly >5%, but not substantially >15%.
3 The coating has flaked off along the cut edges totally, partially or totally in wide strips, and/or some squares have flaked off totally or partially. From 15 to 35% of the cross-hatched area is affected.
4 The coating has flaked off along the cut edges totally in broad strips and/or some squares have flaked off totally or partially. From 35 to 65% of the crosshatched area is affected.
5 Any flaking worse than rating 4.

The dispersion stability (DS) was assessed visually on the basis of 30 day old samples. The freshly prepared dispersions were for this test placed in a 250 ml screw-top glass vessel and stored at room temperature without stirring for 30 days. After this time, the dispersion stability was assessed on the basis of the sediment formed and the transparency of the supernatant dispersion.

The color strength (F) and gloss (G) were assessed visually, on the basis of zinc-plated and yellow-chromated steel panels which had been dipped once in the novel dispersion, in accordance with the following scales:

Color strength
1 very good hiding—no showing through of the substrate material
2 good hiding—slight showing through of the substrate material
3 moderate hiding—moderate showing through of the substrate material
4 poor hiding—severe showing through of the substrate material
5 no hiding—the substrate material has not been hidden Gloss
1 very good gloss—no haze evident on the coated surface
2 good gloss—slight haze evident on the coated surface
3 moderate gloss—haze evident on the coated surface
4 poor gloss—matt coated surface The edge coverage (KB) was assessed at the edges of zinc-plated and yellow-chromated steel panels which had been dipped once in the novel dispersion, and was classified as good, acceptable or poor.

The corrosion protection was tested in analogy to DIN 50021, the salt spray test (SST). For this purpose, zinc-plated and yellow-chromated steel panels were coated with a film of the novel dispersion in a wet film thickness of 50 $\mu$m, corresponding to a dry film thickness of about 10 $\mu$m, and were tested in a customary commercial salt spray chamber. The parameter stated here is the time, in hours, until degree of corrosion 2 is reached.

TABLE 4

| Example No. | GS | DS | F | G | KB | SST |
|---|---|---|---|---|---|---|
| 13 | 1–2 | no sediment | 1–2 | 1 | good | 576 |
| 14 | 2 | no sediment | 1 | 1 | good | 528 |
| CE 1 | 3 | severe sediment | 1–2 | 3 | poor | 312 |
| CE 2 | 2–3 | sediment | 2 | 2–3 | acceptable | 408 |

135/hz

We claim:
1. A method of protecting metallic surfaces against corrosion, comprising:

applying to a metal surface an aqueous polymer dispersion having an aqueous phase and polymer phase, which comprises a component (I) and a component (II), wherein component (I) comprises at least one polymer which includes in copolymerized form at least one $C_2$–$C_{14}$-olefin (monomer (a)), at least one monomer (b), which is copolymerizable with monomer (a) and has at least one acidic functional group and/or a functional group which is converted by hydrolysis into an acidic functional group, and, optionally, additional monomers (c), and component (II) comprises at least one colorant and/or one corrosion inhibitor and, optionally, a UV stabilizer, wherein component (II) is almost completely dispersed or dissolved in the polymer phase, and wherein the content of colorant and/or corrosion inhibitor is from 0.05 to 50% by weight, based on the weight of the polymer; and drying the applied dispersion to form a solid polymer film on the metal surface.

2. The method as claimed in claim 1, wherein monomer (b) is selected from the group consisting of monoethylenically unsaturated carboxylic acids, monoethylenically unsaturated dicarboxylic acids, anhydrides of monoethylenically unsaturated dicarboxylic acids, monoesters of monoethylenically unsaturated dicarboxylic acids, monoethylenically unsaturated sulfonic acids, monoethylenically unsaturated sulfinic acids, monoethylenically unsaturated phosphoric acids and the monoesters thereof, monoethylenically unsaturated phosphoric monoesters, and the alkali metal salts of these acids and monoesters.

3. The method as claimed in claim 1, wherein monomers (c) are selected from the group consisting of the esters of monoethylenically unsaturated carboxylic acids, amides of monoethylenically unsaturated carboxylic acids, the diesters of monoethylenically unsaturated dicarboxylic acids, $C_1$–$C_{10}$-alkyl vinyl ethers, vinyl and allyl $C_2$–$C_{12}$-alkanoates, monoethylenically unsaturated phosphoric esters, monoethylenically unsaturated phosphonic acids (monomers $c_1$), and crosslinking monomers ($c_2$).

4. The method as claimed in claim 3, wherein monomers ($c_1$) are selected from the group consisting of $C_1$–$C_{10}$-alkyl esters, $C_5$–$C_{10}$-cycloalkyl esters, $C_6$–$C_{20}$-aryl esters and $C_7$–$C_{20}$-aralkyl esters of monoethylenically unsaturated carboxylic acids.

5. The method as claimed in claim 1, wherein monomer (a) comprises ethylene and, optionally, propene, 1-butene, 2-butene and isobutene.

6. The method as claimed in claim 5, wherein the polymer comprises in copolymerized form as monomer (a) ethylene, as monomer (b) acrylic acid and/or methacrylic acid and also, optionally, vinylsulfonic acid or one of its alkali metal salts and, optionally, as monomer (c) $C_1$–$C_{10}$-alkyl acrylate and/or $C_1$–$C_{10}$-alkyl methacrylate.

7. The method as claimed in claim 3, wherein the polymer comprises, in copolymerized form, from 50 to 98% by weight of monomer(a), from 2 to 30% by weight of monomer (b), from 0 to 48% by weight of monomer ($c_1$), and from 0 to 5% by weight of monomer ($c_2$).

8. The method as claimed in claim 1, wherein the colorant and the corrosion inhibitor are selected from the group consisting of organic pigments, inorganic pigments, organometallic pigments and other organic compounds which are not soluble in the aqueous phase.

9. The method as claimed in claim 1, wherein the polymer content of the dispersion is from 5 to 40% by weight, based on the overall weight of the dispersion.

10. The method as claimed in claim 1, wherein at least 40% of the acidic groups present in the polymer are in neutralized form.

11. The method as claimed in claim 10, wherein the acidic groups present in the polymer are neutralized with an amine.

12. The method as claimed in claim 1, wherein the solid polymer film has a dry film thickness of below 20 $\mu$m.

* * * * *